United States Patent [19]

Fickes et al.

[11] 4,355,599
[45] Oct. 26, 1982

[54] FLEA COLLAR KIT

[76] Inventors: Scott A. Fickes, 461 Cavour St., Oakland, Calif. 94618; William A. Welch, 1161 Langley Way, Rodeo, Calif. 94572

[21] Appl. No.: 263,010

[22] Filed: May 12, 1981

[51] Int. Cl.³ .................. A01K 27/00; B65D 77/02
[52] U.S. Cl. .................. 119/106; 119/156; 206/229
[58] Field of Search ........ 119/106, 109, 156; 206/229, 569, 570

[56] References Cited

U.S. PATENT DOCUMENTS

| 279,852 | 6/1883 | Atkins | 424/195 X |
|---|---|---|---|
| 1,093,743 | 4/1914 | Tegarden | 119/106 X |
| 2,639,806 | 5/1953 | Recht | 206/229 |
| 3,096,741 | 7/1963 | Ollstein | 119/106 |
| 3,213,830 | 10/1965 | Wiesemann | 119/106 |
| 3,935,839 | 2/1976 | Goodwin | 119/156 |
| 3,946,936 | 3/1976 | Brown | 206/806 X |
| 4,047,505 | 9/1977 | McAndless | 119/106 |
| 4,058,207 | 11/1977 | Koltz | 206/806 X |
| 4,091,766 | 5/1978 | Colliard | 119/106 |
| 4,164,561 | 8/1979 | Hautmann | 424/29 |
| 4,193,986 | 3/1980 | Cox | 424/18 |

Primary Examiner—Gene Mancene
Assistant Examiner—Robert P. Swiatek
Attorney, Agent, or Firm—Phillips, Moore, Lempio & Majestic

[57] ABSTRACT

A flea collar kit comprises a container of liquid flea repellent, a dispenser in the form of an eye dropper, and an adjustable collar composed of an absorbent material.

5 Claims, 2 Drawing Figures

FLEA COLLAR KIT

DESCRIPTION

1. Technical Field

This invention relates to a flea collar kit for controlling flea infestation of an animal.

2. Background Art

Conventional flea collars are normally attached around the neck of a household pet, such as a cat or dog, for repelling fleas. Such repellence of the fleas will interrupt the life cycle of the fleas. Thus, flea infestation of the pet, as well as surrounding areas of the home, is eliminated.

The flea collars are normally impregnated with a suitable flea repellent during their manufacture. Since many pets are highly sensitive to the concentrated chemical constituents of the repellent and oftentimes develop skin irritations and loss of hair, a need has arisen for precisely impregnating the flea collar with a controlled and predetermined quantity of the repellent.

In addition, it may prove desirable to apply the flea repellent to other skin areas of the pet, such as the pet's hindquarters. Although liquid flea repellents are available for application to flea collars and to the pet proper, no kit is currently available which compactly packages the components necessary for expeditious and efficient control of flea infestation of the pet.

DISCLOSURE OF INVENTION

An object of the invention is to overcome the above, briefly-described problems by providing a flea collar kit for expeditiously and efficiently controlling flea infestation of an animal. The kit comprises a container means for containing a liquid flea repellent therein, dispensing means for selectively drawing a predetermined quantity of the liquid flea repellent from the container means, and an elongated and adjustable collar means composed of a porous material for absorbing the liquid flea repellent from the dispensing means.

DETAILED DESCRIPTION

Figure 1:
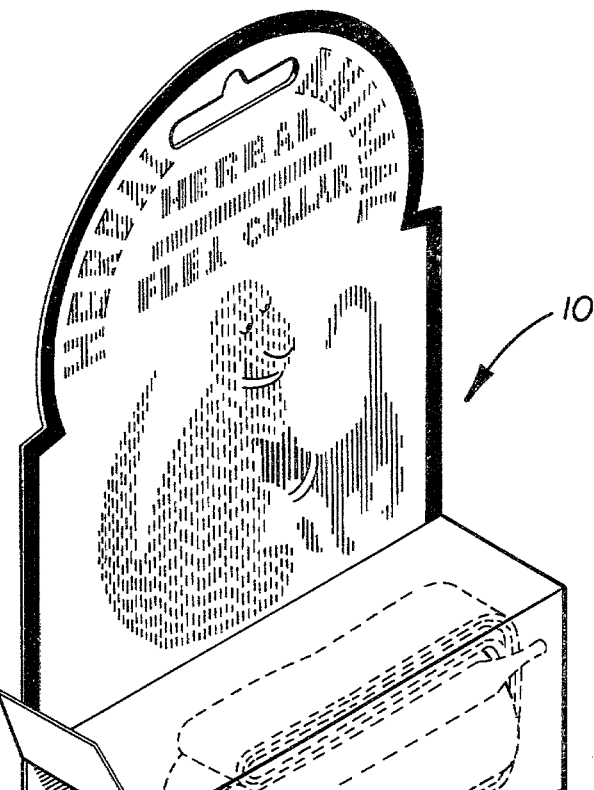
FIG. 1 illustrates a flea collar kit.

FIG. 1 illustrates a paperboard carton 10 having an upstanding placard secured thereon for rack mounting purposes. A closure flap 11 is hingedly mounted on one lateral end of the carton at a suitable score line to provide access to the kit components, illustrated in FIG. 2. The kit components comprise a container means 12 in the form of a bottle having a cap 13 threadably mounted thereon in a conventional manner.

The bottle is filled with a suitably composed liquid flea repellent. For example, the liquid flea repellent may be composed of active ingredients selected from the group consisting of essential oils of cintronella, cedar wood, eucalyptus, orange, and bay. The kit further includes a dispensing means 14, shown in the form of an eye dropper, for selectively drawing a predetermined quantity of the liquid flea repellent from the opened bottle and for ejecting the repellent onto an elongated and adjustable collar means 15.

Figure 2:
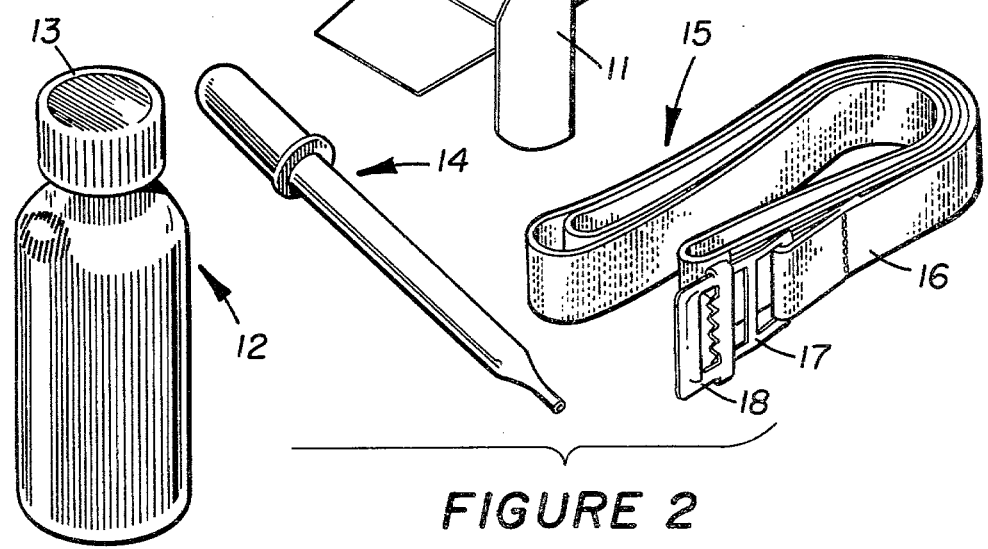
FIG. 2 illustrates a container, a dispenser, and a collar of the flea collar kit.

As further shown in FIG. 2, the collar means comprises a neck-engaging strap 16 composed of a porous fabric material, such as woven cotton, for absorbing the liquid flea repellent from the eye dropper. A standard buckle is attached to one end of the strap and may comprise a first buckle member 17 secured to the strap and a second buckle member 18 slidably mounted on the first buckle member. As shown in FIG. 2, the collar is reverse-folded upon itself and is looped about an end of container means 12.

After the collar has been cut to size, the free end of strap 16 can be inserted through the buckle members in a conventional manner to secure the collar means around a pet's neck. If so desired, drops of the liquid flea repellent could also be applied to the pet proper, such as to the pet's hindquarters.

We claim:

1. A flea collar kit for controlling flea infestation of an animal comprising
   a container having a liquid flea repellent therein,
   dispensing means for selectively drawing a predetermined quantity of said liquid flea repellent from said container,
   elongated and adjustable collar means, composed of a porous material, for absorbing drops of said liquid flea repellent from said dispensing means, and
   a holding means for retaining said container, dispensing means, and collar means.

2. The flea collar kit of claim 1 wherein said dispensing means comprising an eye dropper.

3. The flea collar kit of claim 2 wherein said collar means comprises a strap composed of a woven fabric material and a buckle attached to an end of said strap.

4. The flea collar kit of claim 3 wherein said holding means comprises a carton having an upstanding placard secured thereon for rack mounting purposes and a closure flap hingedly connected on a lateral end of said carton, said container, said dispenser means, and said collar means being disposed in said carton.

5. The flea collar kit of claim 4 wherein said collar means is reverse-folded upon itself and is looped about an end of said container.

* * * * *